United States Patent [19]

Becker et al.

[11] Patent Number: 4,835,721

[45] Date of Patent: May 30, 1989

[54] FREQUENCY SYNTHESIZER

[75] Inventors: Thomas A. Becker, Fullerton; Paul J. Cuenin, Anaheim; Lester Mintzer, Santa Ana, all of Calif.

[73] Assignee: Rockwell International Corporation, El Segundo, Calif.

[21] Appl. No.: 655,662

[22] Filed: Sep. 28, 1984

[51] Int. Cl.⁴ .............................................. G06F 1/02
[52] U.S. Cl. ................................................... 364/717
[58] Field of Search ....................... 343/5 PN; 364/717

[56] References Cited

U.S. PATENT DOCUMENTS

| | | | |
|---|---|---|---|
| 3,609,327 | 9/1971 | Perlman | 364/717 |
| 4,375,620 | 3/1983 | Singer et al. | 364/717 |
| 4,516,217 | 5/1985 | Starner | 364/717 |
| 4,571,556 | 2/1986 | Gnerlich et al. | 364/717 |

*Primary Examiner*—Theodore M. Blum
*Attorney, Agent, or Firm*—H. Fredrick Hamann; George A. Montanye; James F. Kirk

[57] ABSTRACT

A frequency synthesizer for use by an operator or other means for continuously generating an output noise signal, the frequency synthesizer comprises a digital means for directly synthesizing random noise having controlled spectral amplitudes. The synthesized random noise is characterized by a series of digital composite frequency synthesizer output noise signal sample values. The digital means comprises a means for providing and for periodically changing a series of sets of shifted segment frequency values, each set of shifted segment frequency values having a controlled series of random frequency values. Each frequency value is a random digital number selected to be within a range corresponding to a segment frequency band and characterizes a shifted segment frequency value. A plurality of digital oscillators is included, each oscillator having a corresponding segment frequency band. Each oscillator output is a series of digital values that sequentially characterizes a sinusoid having a frequency that equals the shifted segment frequency of the respective frequency band. A means for sequentially sampling the output amplitude of each oscillator and for combining each sampled oscillator output value with a corresponding predetermined frequency segment gain value to obtain a corresponding set of segment gain scaled sample values. A means for summing each segment gains scaled sample value within the set to obtain a composite frequency synthesizer output noise signal sample value is included along with a means with for forming a continuous output signal from a series of the composite frequency synthesizer output noise signal sample values.

12 Claims, 6 Drawing Sheets

FREQUENCY SYNTHESIZER

BACKGROUND OF THE INVENTION

1. Field of the Invention

This invention relates to frequency synthesizers and more particularly to the field of frequency synthesizers for producing noise with predereetermined amplitudes within predetermined frequency bands. The invention frequency synthesizer is particularly adapted for use in synthesizing the acoustical signatures, or sounds, of objects moving in an undersea environment, such as those sounds made by ambient ocean noise, currents propulsion, and machinery noise.

2. Description of the Prior Art

There are no known techniques for the direct synthesis of band limited noise of arbitary shape. A common method for noise generation is to pass a wide band noise source through a predetermined network of filters. Each filter then limits the noise to its respective band. The outputs of each respective filter are then scaled and summed to construct a predetermined composite response. This standard filter approach has been implemented with both analog and digital circuits. The noise spectrum within each predetermined band can be changed by calculating a new set of filter coefficients and/or changing the gain scalers for each respective band's filter.

The prior art approach to synthesizing noise with controlled bands is costly to implement. Requirements for a frequency synthesizer of this type requires design of many filter elements to obtained the required spectrum shape characteristics. In addition to the design and cost of the the filters, additional time and hardware must be expended to implement any required spectrum shape changes. For example, a prior art frequency synthesizer of the above referenced type, required to provide a seven octave band of noise with one-third octave segments, would require 21 paralleled multiple stage narrow band filters. This represents a significant amount of hardware and cost and demonstrates a substantial lack of flexibility.

SUMMARY OF THE INVENTION

It is a major objective of this invention to provide a frequency synthesizer capable of direct synthesis of broadband noise of arbitrary spectrum shape.

It is another objective of this invention to provide a broadband noise frequency synthesizer without the use of narrow band filters.

These and other objectives of the invention frequency synthesizer are realized by a unique all digital direct synthesis system, a particular embodiment of which provides amplitude controlled one-third octave segments implemented with simple digital oscillators. The output of each oscillator is made noise-like by a precisely controlled random rapid modulation of the oscillator frequency. The range of each oscillator frequency excursion approximates the bandwidth of each one-third octave segment. Each one-third octave segment corresponds to a respective segment center frequency.

In a first alternative embodiment, the invention frequency synthesizer is intended for use by an operator or other control means, such as a preprogrammed computer, for continuously generating an output signal. This embodiment comprises a digital means for directly synthesizing random noise having predetermined controlled spectral shape or amplitudes.

In a more particular embodiment of the invention frequency synthesizer, the means for directly synthesizing random noise having predetermined controlled spectral amplitudes further comprises: a means for characterizing a predetermined array of frequency band ranges, each frequency band range being located on the frequency spectrum by a corresponding array of frequency band location numbers. This embodiment further comprises means for generating sets of random numbers, the random numbers in each set corresponding to a frequency band location number and being scaled to have a value within a range corresponding to the frequency band range of its related frequency band location number. In addition, this embodiment has a means for functionally combining the random numbers of each set with each random number's corresponding frequency band location number to obtain a corresponding set of shifted segment frequency values.

An array of digital oscillators is included, each digital oscillator corresponding to a frequency band range and having a frequency and a sinusoidal output corresponding to a respective shifted segment frequency value.

A means for sampling the ampltitude of the output of each oscillator in the array is included to obtain a corresponding set of sampled oscillator output values along with a means for functionally combining each sampled oscillator output value with a corresponding predetermined segment gain value to obtain a corresponding set of segment gain scaled sampled values.

A means for summing all segment gain scaled sample values within the set is included to obtain a composite frequency synthesizer output noise to signal sample value.

A means for forming a continuous output signal from a series of said composite frequency synthesizer output noise signal sample values is also inluded in this embodiment.

In another alternative embodiment of the frequency synthesizer, each of the digial oscillators further comprises a output angle register, each output angle register corresponding to a frequency band location number and a shifted segment frequency value.

A means for replacing the contents of each respective output angle register with the sum of its respective digital random frequency change value, and its respective last output angle register value is included.

In this way, the contents of each of said output angle registers are sequentially updated to hold an output angle value.

BRIEF DESCRIPTION OF THE DRAWINGS

FIG. 5b is a continuation of the block diagram of FIG. 5a.

PREFERRED EMBODIMENT

Figure 1:
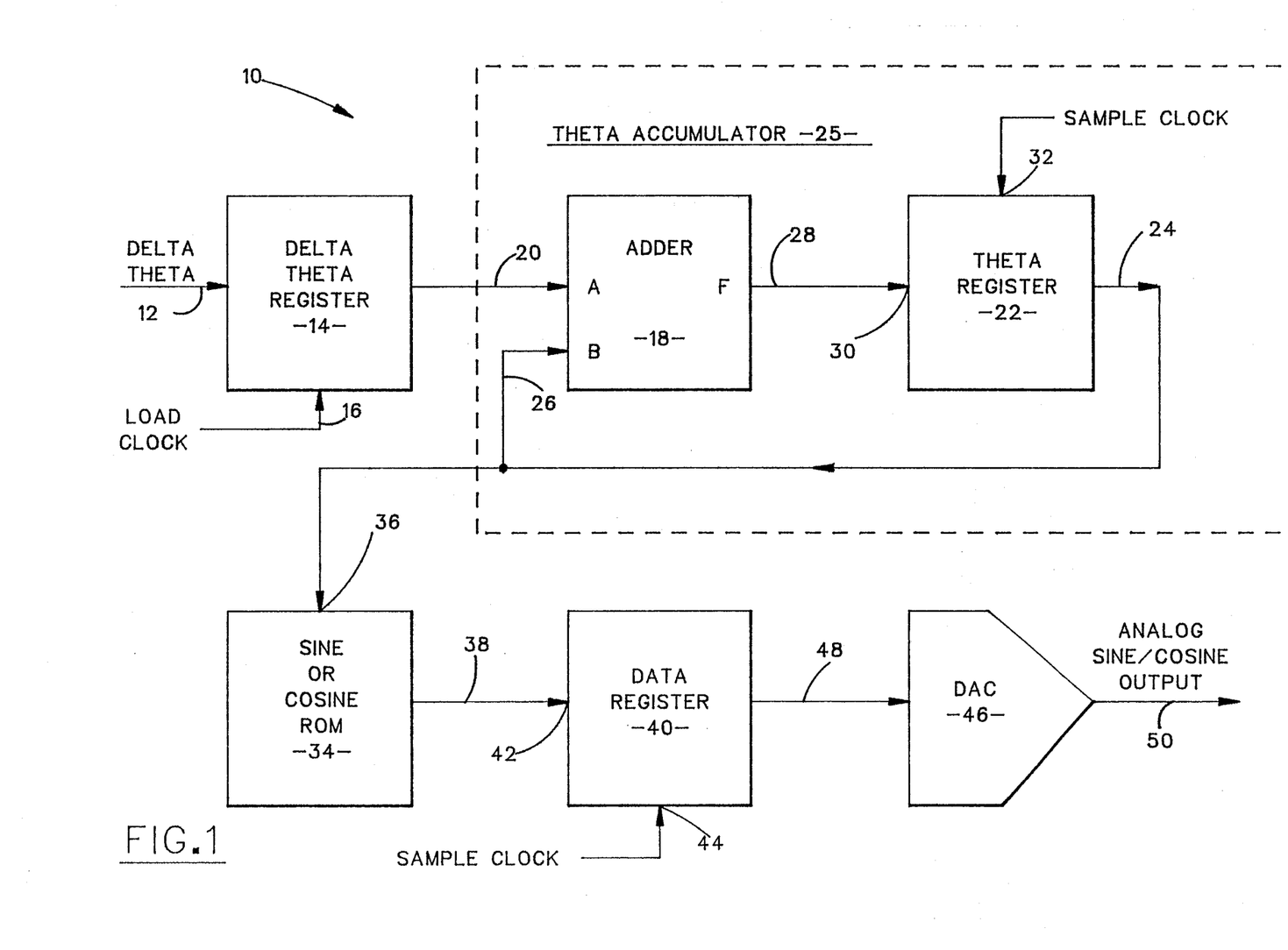
FIG. 1 is a block diagram of a prior art digital frequency synthesizer.

FIG. 1 shows the block diagram 10 of a digital tonal synthesizer capable of direct digital frequency synthesis. The synthesizer receives a digital input DELTA THETA as a data word on a parallel data bus 12 to the DELTA THETA REGISTER 14. The DELTA THETA data word is typically 16 or 32 bits long and is loaded into the DELTA THETA REGISTER in response to a clock signal such as the LOAD CLOCK signals on input 16.

ADDER 18 receives the DELTA THETA data word from the DELTA THETA REGISTER 14 on a parallel data bus 20 at its input "A". ADDER 18 receives a second input at input "B" from the THETA REGISTER 22 output 24 on parallel data bus 26. ADDER 18, by combinational logic, provides the arithmetic sum of the data words at its inputs "A" and "B" at its output at "F" and via parallel data bus 28 to THETA REGISTER 22 replaces the contents of the THETA REGISTER 22 with the data at its input 30 in response to the SAMPLE CLOCK signal at its CLOCK input 32. The THETA ACCUMULATOR, phantom block 25, accumulates the outputs of the DELTA THETA REGISTER 14 and includes ADDER 18 and THETA REGISTER 22.

The THETA ACCUMULATOR 25 has a predetermined range. As the range of the THETA REGISTER 22 is exceeded, the register 22 overflows and cycles through zero. The output of the Theta register 22 as a function of time has the appearance of a staircase or sawtooth having a frequency that is dependent on the magnitude of the DELTA THETA data word received on parallel data bus 20 at the adder input "A" and also on the frequency of the SAMPLE CLOCK signal at the THETA REGISTER CLOCK input 32.

The output of the THETA REGISTER on data bus 26 is received by a SINE or COSINE ROM 34 at input 36. The SINE or COSINE ROM 34 provides an output on a parallel data bus 38 to DATA REGISTER 40 at data register input 42. The DATA REGISTER replaces its contents with the SINE or COSINE output data in response to a SAMPLE CLOCK signal at its clock input 44 and provides a digital output data word to the DAC (digital-to-analog converter) 46 on parallel data bus 48. DAC 46 converts the series of data words received at SAMPLE CLOCK rate to a relatively continuous analog SINE or COSINE output signal at DAC output 50.

Direct Digital Tone Generator Operation

For the purpose of illustrating operation of the direct digital tone generator of FIG. 1, assume that the data word on the DELTA THETA parallel bus 12 is zero. ADDER 18 receives the contents of the THETA REGISTER at input "B". ADDER 18 produces a sum at its output "F" equal to the output of the THETA REGISTER 22 on its output 24 for as long as the data word at input "A" is zero. The output of the THETA REGISTER on data bus 26 to the SINE or COSINE ROM 34 appears to be constant and will result in a sine or cosine ROM output on bus 38 having a zero frequency.

Next, assume that the value of the data word stored in the DELTA THETA REGISTER 14 has a magnitude equal to 1/100th of the range of the THETA REGISTER 22 and that the value of the output of the DELTA THETA REGISTER on data bus 20 to adder input "A" remains constant. As each SAMPLE CLOCK signal is received at THETA REGISTER clock input 32, the contents of the THETA REGISTER 22 will be incremented in a positive sense and can be expected to overflow repeatedly after each series of 100 clock cycles. The output on data bus 26 to the SINE or COSINE ROM 34 appears as a function of SAMPLE CLOCK time increments as a staircase starting with a value of zero and having 100 steps after which the staircase would reset to zero. The SINE or COSINE ROM 34 is programmed to respond to a linearly increasing series of data words to its input with a series of data words on parallel data bus 38 that describe a sine or cosine function of constant frequency equal to 1/100 of the clock rate.

To obtain an output frequency at the next higher octave, the value of DELTA THETA REGISTER output on 20 is multiplied by two. Division or multiplication of binary values by a factor of two is conveniently achieved by a register shift operation or by selecting the appropriate set of register output lines.

By doubling the magnitude of the DELTA THETA word stored in the DELTA THETA REGISTER 14 and available on the parallel data bus 20 at adder 18 input "A", the staircase function appearing at SINE or COSINE ROM input 36 reaches its maximum value in half the number of Sample Clock cycles required for the prior example. By scaling the maximum range of the output of the THETA REGISTER 22 on bus 24 to represent a range extending from zero to 360 degrees and by scaling the ROM 34 to interpret all inputs from register 22 to correspond to angles between zero and 360 degrees, the SINE or COSINE ROM 34 will provide a series of ROM data word outputs characterizing the SINE or COSINE of an angle as the angle is varied by zero to 360 degrees. The ROM 34 output 38 advances through each cycle in one half the number of clock periods thereby doubling the frequency of the function described by the series of data words on the parallel data bus. The data register 40 is updated with each change of the SINE or COSINE ROM output by the SAMPLE CLOCK signal. DAC 46 produces a SINE or COSINE function at its output 48 having 100 steps in the second example above and a 50 step sinusoidal output in the last example.

DIRECT NOISE SYNTHESIS

Figure 2:
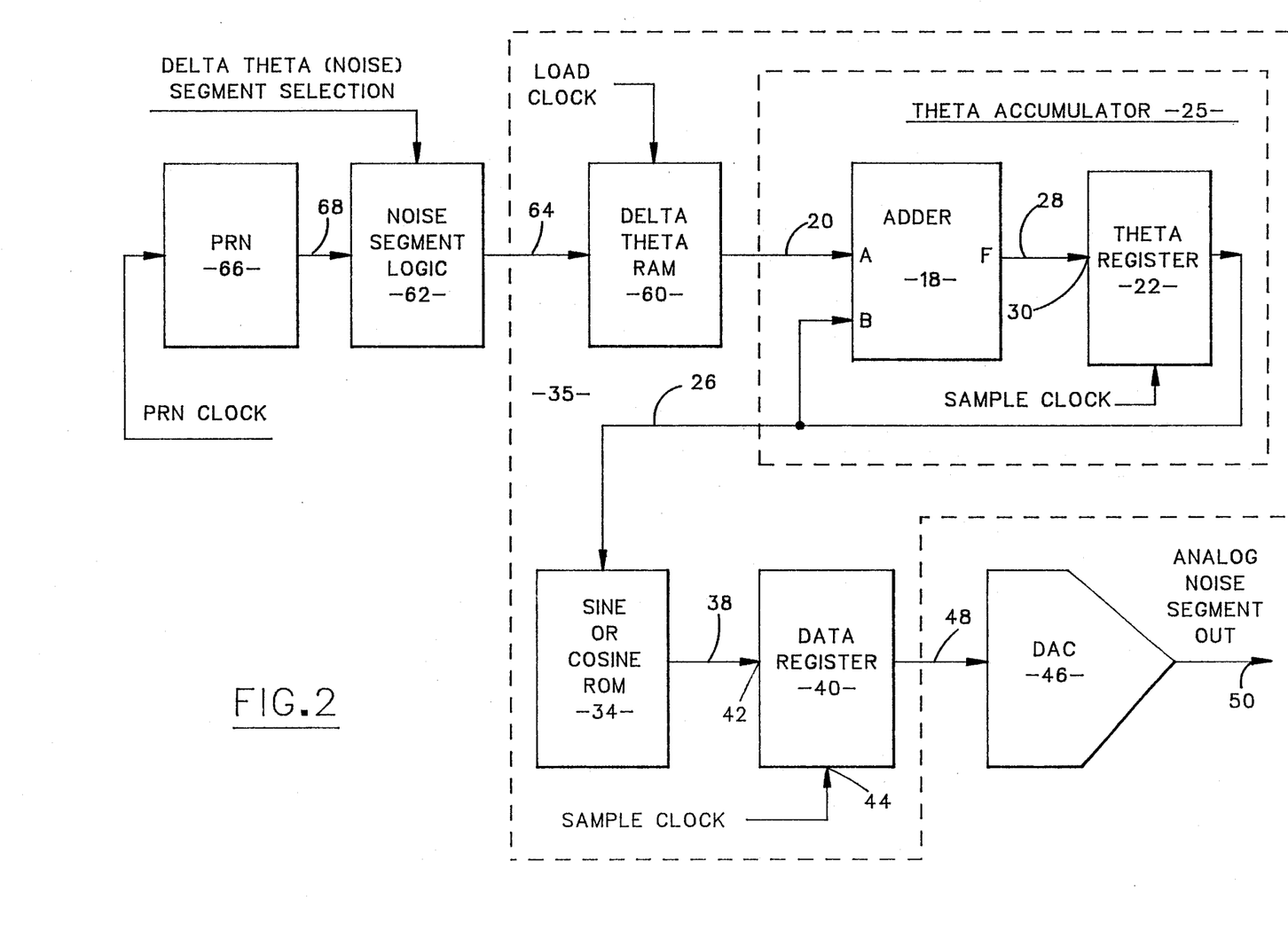
FIG. 2 is a simplified block diagram of a programmable noise segment generator using the prior art frequency synthesizer of FIG. 1.

FIG. 2 shows the block diagram of FIG. 1 receiving an input from a DELTA THETA RAM (random access memory) location or register 60 on parallel data bus 20 to adder input "A". The DELTA THETA RAM 60 is updated by noise SEGMENT LOGIC 62 with a data word received on parallel data bus 64. The NOISE SEGMENT LOGIC block 62 is responsive to an output from the PRN (pseudo random noise) generator block 66 on parallel data bus 68. The PRN block 66 provides a series of random numbers at a rate determined by the PRN CLOCK rate such as a CLOCK rate of 1 MHz. The PRN block 66 provided a series of random numbers having a resolution such as $2^{31}-1$ logic states and, in one embodiment, an "epoch" of 35.79 minutes.

The Delta Theta (NOISE) segment selection signal into the NOISE SEGMENT LOGIC block 62 selects or designates the frequency band or frequency segment to be updated. The output of the digital oscillator characterized by blocks 18, 22, 34, 40 and 46 is made noise-like by a precisely controlled rapid modulation of the oscillator output frequency at DAC output 50 by rapidly replacing the data word stored in DELTA THETA RAM 60 with a series of random numbers characterized by operation of the NOISE SEGMENT LOGIC 62 output on parallel bus 64 to rapidly shift the oscillator frequency to random values within a predetermined noise frequency band or segment.

Figure 4:
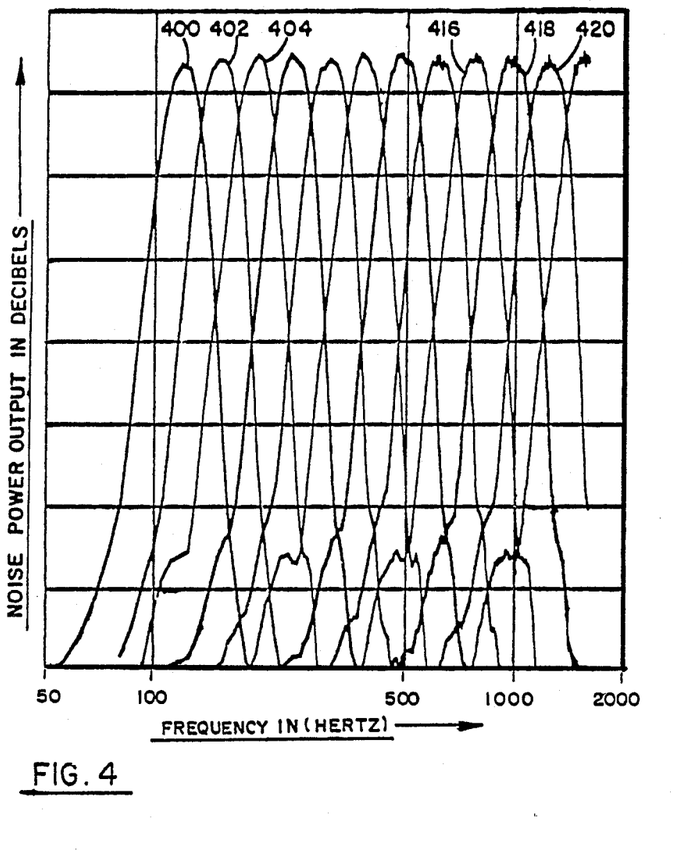
FIG. 4 is a schematic characterization of a twelve segment noise spectrum.

To illustrate a preferred embodiment of the invention, consider FIG. 4 showing a schematic characterization of a twelve segment noise spectrum. White noise has a flat amplitude across the spectrum. The object of this invention noise synthesizer is to be able to modify the amplitude or gain of a noise spectrum over a number of bands of interest without the necessity of constructing a series of customized filters. The spectrum between 100 and 1600 Hertz is illustrated in FIG. 4 to be divided by 12 bands or segments, the first three lowest frequency segments being numbered 400, 402 and 404 and the last three highest frequency segments being numbered 418, 420 and 422. The first three frequency bands or segments occupy an octave of frequency extending from slightly above 100 Hertz to slightly above 200 Hertz. Each successive set of three octaves occupies an additional frequency band that has a range extending from the upper limit of the preceding frequency band to double the frequency of the preceding frequency band. The second three segments extend from a frequency slightly in excess of 200 Hertz to an upper limit slightly in excess of 400 Hertz. The next three higher segments are shown extending from a frequency slightly in excess of 400 Hertz to a frequency segment 416 centered at slightly in excess of 800 Hertz. Each segment therefore occupies a frequency band having a one-third octave range.

It is understood that the allocation of the frequency spectrum of interest need not be in ⅓ octave segments nor in uniformly displaced segments. The segment octave allocation for an particular system must depend on the system bandwidth and fidelity requirements and on the economics required of the design among other factors.

In a system characterized as having segments spaced at one third octaves, the reference frequencies for each segment are spaced a constant multiple distance above the preceding lower reference frequency so that exactly three such reference frequencies are contained in any frequency span of one octave. Thus, adjacent frequencies are related as follows: $f_1=Kf_0$, $f_2=Kf_1$, $f_3=Kf_2$, $f_4=Kf_3$, etc. Exactly three frequencies per octave means that $f_5$, $f_4$, $f_3$ are in one octave when $f_2$, $f_1$, $f_0$ are in the next lower octave. It follows that the lowest frequencies in each octave are related by a factor of two. For example: $f_3=2f_0$. From the above relationship it follows that:

(1.) $f_3 = Kf_2 = K(Kf_1) = K^2(Kf_0) = K^3 f_0$ and since:

(2.) $f_3 = 2f_0$ then:

(3.) $K^3 f_0 = 2f_0$ (4.) $K^3 = 2$ (5.) $K = \sqrt[3]{2} = 1.2599$

The reference frequency of each one-third octave band is thereby obtained by multiplying each successive frequency by this constant as shown below in Table 1.

TABLE 1

| | | |
|---|---|---|
| $f_0 =$ | Reference frequency | = 100 |
| $f_1 =$ | 100 × 1.2599 | = 126 |
| $f_2 =$ | 125.99 × 1.2599 | = 159 |
| $f_3 =$ | 158.73 × 1.2599 | = 200 |
| $f_4 =$ | 200 × 1.2599 | = 252 |
| 0 | | 0 |
| 0 | | 0 |

For the purpose of illustration in discussing this preferred embodiment, the location of any particular one-third octave segment will be characterized by a reference frequency or frequency number as shown above. It is understood that frequency segments can also be located in other ways such as by characterizing each of their center frequencies.

By way of example, if the output bandwidth of the system is required to extend from a base frequency of 1.25 KHz to 20 KHz in four segments or bands as in Table 2 below:

TABLE 2

| |
|---|
| 10 KHz to 20 KHz |
| 5 KHz to 10 KHz |
| 2.5 KHz to 5 KHz |
| 1.25 KHz to 2.5 KHz | four digital oscillators as shown in FIG. 2 can be used to provide four outputs, each output corresponding to one of the above segments. The output of each of the four oscillators are sampled sequentially and added to from a composite output signal (not shown). To obtain suitable fidelity at the highest output frequency required, the outputs would be sampled typically at a rate equal to or greater than four times the highest output frequency, i.e., typically 80 KHz in this example. Each of the four respective oscillator frequencies would typically be updated to new random frequencies within its respective segment band of frequencies at an update rate of typically one-fifth of the reference frequency for the segment. Thus, the segment having a reference frequency of 1.25 KHz would typically be updated as to its randomly selected output frequency at a 250 Hz rate. The segment having a reference frequency of 10 KHz would typically be updated at a 2 KHz rate. The update rate to be used in practice for each segment is determined empirically. The update rate for each segment is controlled by the Delta Theta (NOISE) Segment Selection Signal to the NOISE SEGMENT LOGIC block 62.

DESCRIPTION

Figure 3:
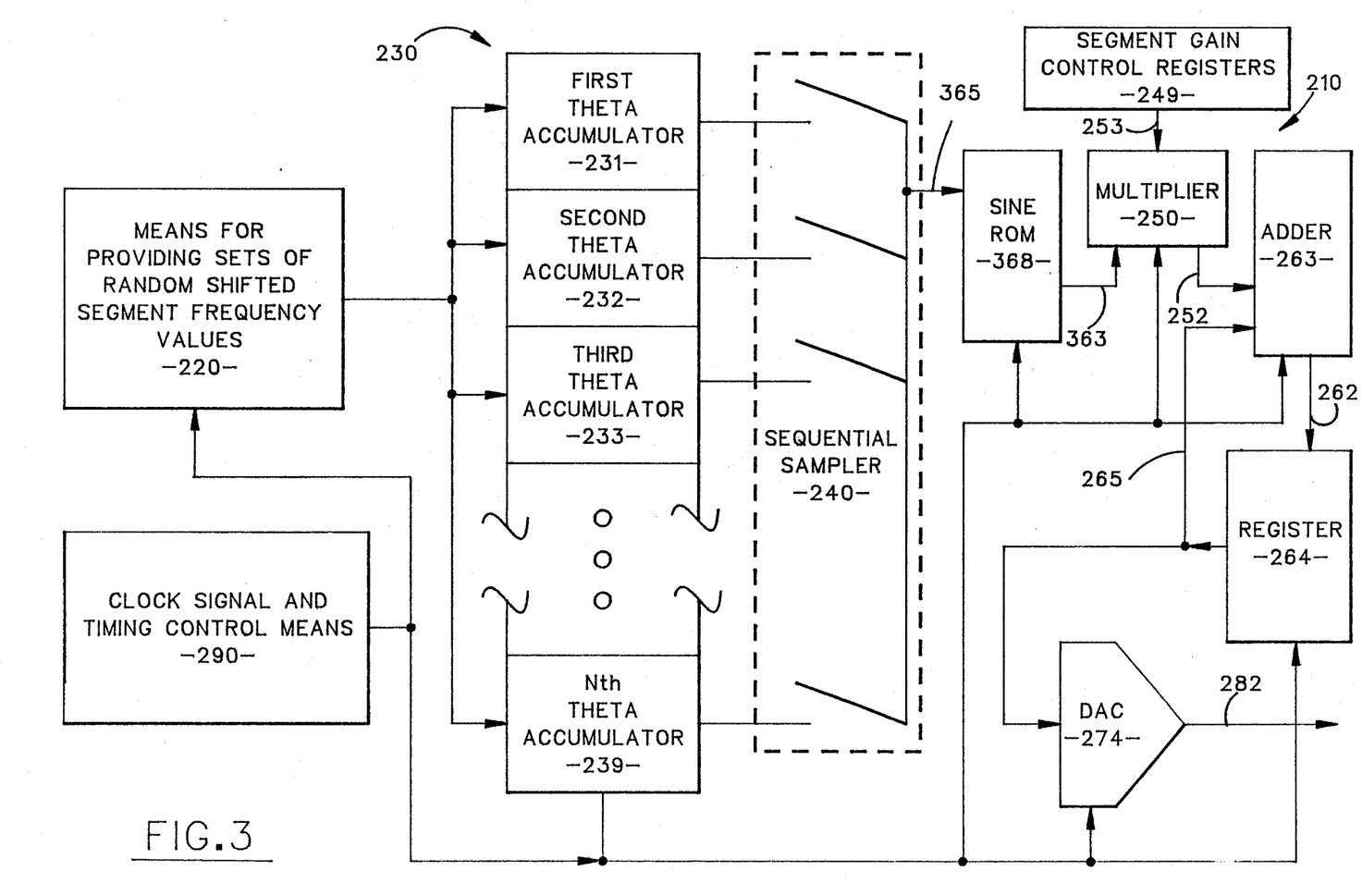
FIG. 3 is a simplified block diagram of a the invention frequency synthesizer.

FIG. 3 is a block diagram of a preferred embodiment of the invention frequency synthesizer comprising a digital means identified by reference number 210 for directly synthesizing random noise having predetermined controlled spectral amplitudes. The synthesized random noise is characterized by a series of digital composite frequency synthesizer output noise signal sample values.

The digital means 210 for directly synthesizing random noise having predetermined controlled spectral amplitudes comprises a means, such as block 220, for providing and for periodically changing a series of sets of shifted segment frequency values. Each set of shifted segment frequency values has a random series of element values, each element value being a random digital number selected to be within a range corresponding to a segment frequency band and characterizing a shifted segment frequency value. A plurality of digital THETA ACCUMULATOR oscillators, such as 231, 232, 233 . . . 239 shown in block 230, are included. Each THETA ACCUMULATOR has a corresponding segment frequency band and is responsive to its respective set of shifted segment frequency values from block 220. Each Theta Accumulator output is a series of digital values, each series of digital values sequentially characterizes a periodic ramp function having a frequency that fluctuates about the shifted segment frequency of the respective frequency band.

Block 240 represents a means for sequentially sampling, at precise time intervals, the instantaneous output Theta Value of each segment's THETA ACCUMULATOR for application on bus 365 to the input of the SINE ROM 368. Each Theta Value is thereby converted to a corresponding SINE amplitude.

SINE ROM block 368 is a conventional SINE/COS ROM programmed to provide a digital output on bus 363 characterizing the numerical value of the SIE or COSINE of an angle in response to a data input from sampler 240. The SINE ROM 368 is necessary because oscillators 231, 232 . . . 239 provide sawtooth like outputs. The frequency of the sawtooth outputs define the frequency of the outputs of SINE ROM 368.

Blocks 249 and 250 function as a means for functionally combining each sampled oscillator output value on bus 363 with a corresponding predetermined segment gain value on bus 253 to obtain a corresponding set of segment gain scaled sample values on bus 252.

Block 249 characterizes an array of addressable segment gain control registers. Each register is initialized by an operator or by alternative means to have a gain value for each segment.

Multiplier 250 multiplies each digital value on bus 363 with a corresponding value on bus 253 and outputs the product on bus 252 to adder 263.

ADDER 263 adds the incremental gain scaled sampled values from line 252 with the partial sums in REGISTER 264 via line 265 and restores each total via line 262 into REGISTER 264. Blocks 263 and 264 therefore operate as a means for summing each segment gain scaled sample (amplitude) value within each set to obtain a continuous series of digital composite output noise signal sample values.

Register block 264 and Digital-to-Analog Converter (ADC) block 274 represent a means for forming a continuous output signal from a series of composite output noise signal sample values.

Figure 5A:
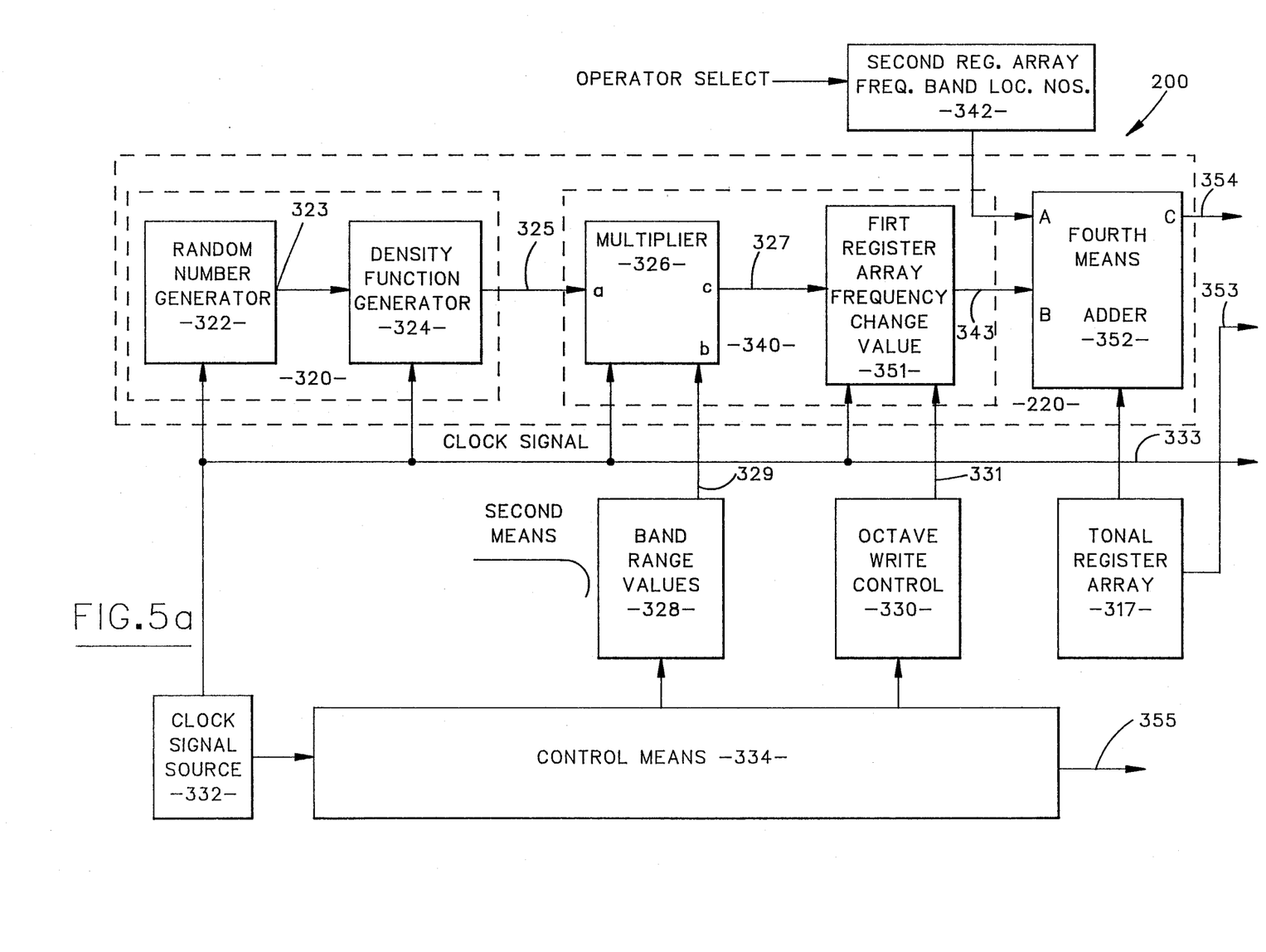
FIG. 5a is a partial block diagram of the preferred embodiment of the invention frequency synthesizer.

Referring now to FIG. 5A, the digital means 200 for directly synthesizing random noise having predetermined controlled spectral amplitudes or shape is more particularly characterized as having a means represented by phantom block 220 for characterizing a predetermined array of frequency bands or frequency band ranges. Each frequency band range is located on the frequency spectrum by a corresponding frequency band location number. The frequency band location numbers are stored in registers within SECOND REGISTER ARRAY 342. Each register within the array contains a frequency band location number. Each frequency band location number represents a reference frequency band location or start frequency or center frequency selected to locate the respective frequency band.

The elements within phantom blocks 320 and 340 operating together represent a means for generating a continuous series of sets of random numbers. Each random number in each set corresponds to a frequency band location number and is scaled to have a value within a range corresponding to the frequency band range of its related frequency band location number. Each random number is transferred on line 343 to the B input of ADDER 352.

Figure 5B:
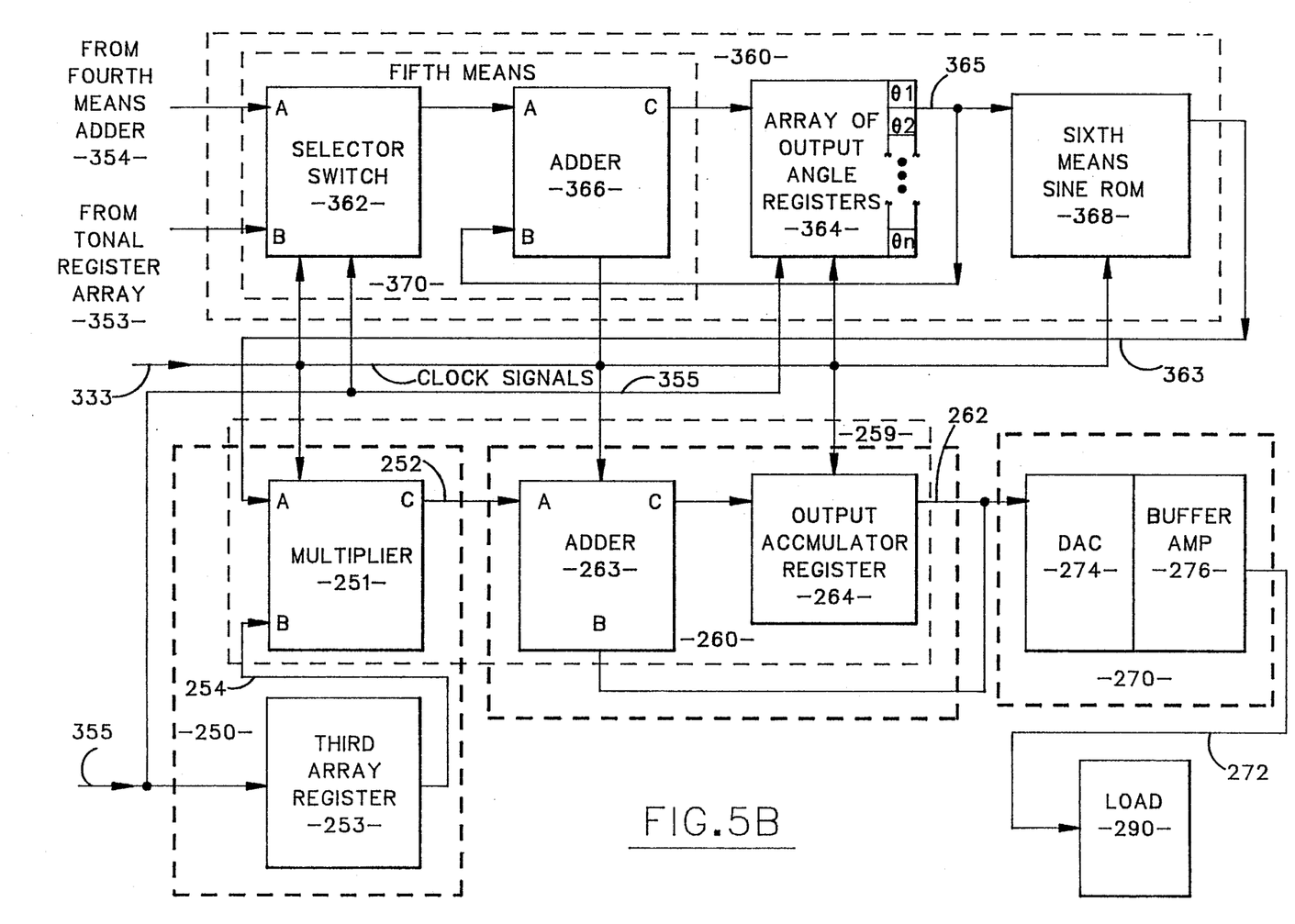

The elements within phantom block 220 represent a means, such as adder 352, for combining each respective random number via line 343, with its corresponding frequency band location number, via line 344, to obtain a corresponding set of shifted segment frequency values on line 354. The shifted segment frequency values are sent via line 354 from ADDER 352 to the A input of fifth means selector switch 362 as shown in FIG. 5B. The "lines" thus far mentioned are understood to be schematic representations of data paths of serial or parallel character.

The blocks within phantom block 360 in FIG. 5B represent a means for providing an array of oscillator outputs via line 363, such as an array of digital oscillators. Each digital oscillator provides an output signal that corresponds to a particular frequency band range. Each output is sinusoidal and is characterized by a series of digital values on line 363 and has a frequency corresponding to a respective shifted segment frequency value. The elements within phantom blocks 360, such as 362 and 364, operate under the control of control means 334 via signals on line 355 and function as an array of independent digital oscillators. The digital values stored in each register of output angle register array 364 rise as a fluctuating linear ramp or sawtooth and upon reaching a predetermined limit, each register overflows and is reset.

The blocks within phantom block 250, under control of control means 334, represents a means for establishing and sampling the amplitude of the output of each oscillator in the ARRAY OF OUTPUT ANGLE REGISTERS 364 to obtain a corresponding set of sampled oscillator output values on signal line 363.

All incrementing and sampling is done with uniform time increments and is precisely controlled by CLOCK SIGNAL SOURCE 332 in FIG. 5A. Sampling of the array of output angle registers 364 via line 365 is typically established at a recurrence rate of four times that of the highest frequency of interest. Thus, if the system was required to provide noise to 20 kHz, the output angle register array 364 will typically be updated and sampled at a rate equal to 80 kHz. The SINE ROM 368 represents a sixth means for converting the sets of digital values on signal line 365 directly to SINE values on signal line 363.

The elements within phantom block 250 function to provide a means for functionally combining each sampled oscillator (SINE) output value on line 363 with a corresponding predetermined segment gain value from third array registers 253 on signal line 254 to obtain an a corresponding set of segment gain scaled sampled values on line 252.

Phantom block 260 contains elements that provide a means for summing each segment gain scaled sample value on signal line 252 with a partial sum of previous segment's gain scaled sample values on signal line 262. The segment gain scaled sample values within each set are added to obtain a composite output noise signal sample value. The sequence of composite noise signal sample values on line 262 are shifted to DAC 274 to form a continuous series of values.

The elements within phantom block 270 represent a means for forming a continuous output signal on line 272 from the series of composite frequency synthesizer output noise signal sample values on signal line 223 to DAC 274 in response to the composite frequency synthesizer output noise signal on signal line 262.

In a more particular alternative embodiment of the invention frequency synthesizer, the elements within phantom block 360 that represent a means for providing an array of digital oscillator output signals further comprises an array of output angle registers 364. Each output angle register (not shown) but designated as $\theta 1$, $\theta 2$, ... $\theta n$ corresponds to a frequency band location number and a shifted segment frequency value that is also associated with the respective frequency band location number and which is periodically being updated.

The elements within phantom block 370 in FIG. 5B represent a means for replacing the contents of each respective output angle register $\theta 1$, $\theta 2$, ... $\theta n$, with the sum of its respective digital random frequency change value on line 354 at multiplier input A and its respective last output angle register value on line 365. The contents of each output angle register, $\theta 1$, $\theta 2$, ... $\theta n$ are sequentially updated. As each output angle register is updated, it holds an output angle value on signal line 365. After each summation of the values at the A and B inputs of ADDER 366, the sum is transferred to the respective register in the array of output angle register 364 in response to control signals from clock signals on line 333.

In another more particular embodiment, the output noise signal is formed by a continuous series of sequential digital values appearing in OUTPUT ACCUMULATOR REGISTER 264. The sequential digital values representing totals of segment gain scaled sampled values within successive sets of segment gain scaled sample values are each sequentially coupled to a digital to analog converter (DAC) 274 and converted to a relatively continuous analog signal voltage. The continuous analog voltage values are then coupled to the input of a buffer amplifier 276. The buffer amplifier then provides a sufficiently low output impedance, bandwidth and power gain to faithfully reproduce the signal from the output of DAC 274 to load 290 via signal line 272.

In the embodiment of FIG. 5A and 5B, an operator or other means, such as a preprogram computer, can control the noise amplitude distribution within at least one predetermined frequency band. Typically 20 noise band segments or more are controlled for a predetermined, operator defined total output frequency band to synthesize the acoustics of a slowly rotating marine propeller.

Referring to FIG. 5A, the frequency synthesizer comprises a CLOCK SIGNAL SOURCE 332 that typically provides several clock signals. The clock signal is coupled to a control means, such as that represented by block 334. The control means 334 provides a means to change the noise amplitude distribution according to a predetermined time sequenced schedule or set of algorithms. A microcomputer following a predetermined program can be used to provide the required timing a control of block 334.

Block 320 represents a first means responsive to the control means 334 for sequentially providing a clocked sequence of probability density function shaped digital random numbers within a prdetermined range of values. A typical probability density function is one selected to have a triangular form selected to extend halfway into adjacent segments.

BAND RANGE VALUES block 328 represents a second means responsive to the control means 334 for sequentially providing a clocked sequence of digital band range values. Each digital band range value characterizes the frequency band width of a predetermined frequency segment. Block 328 is typically implemented using a stack of sequentially sampled registers, each segment having a register, each register being initialized to have the required predetermined range values.

Phantom block 340 represents a third means having a first array of addressable digital registers, such as first register array block 351. The elements within phantom block 340 are responsive to the control means block 334 for sequentially selecting each respective digital band range value from the second means block 328 via line 329 and functionally combining each respective selected digital band range value with the corresponding probability density function shaped digital random number from DENSITY FUNCTION GENERATOR 324 via line 325 to form a digital random frequency change value. Each successive digital random frequency change value is stored in a respective FIRST ARRAY DIGITAL REGISTER 351. MULTIPLIER BLOCK 326 illustrates one means of functionally combining the values on lines 325 and 329.

A second array of addressable digital registers is represented by block 342. Each second array digital register is initialized by an operator or by other means to contain a respective frequency band location number. The band location number is typically a band start, center or end frequency. Each frequency band or frequency segment is assigned a location number.

ADDER Block 352 in FIG. 5A represents a fourth means that is responsive to the CONTROL MEANS 334 for sequentially combining the value of each respective frequency band location number selected in sequence from SECOND REGISTER ARRAY block 342 with a corresponding digital random frequency change value from FIRST REGISTER ARRAY 351 to form a shifted segment frequency value on signal line or data bus 354. Each shifted segment frequency value characterizes a frequency corresponding to a respective frequency band or segment location frequency shifted by the digital random frequency change value stored temporarily in the FIRST REGISTER ARRAY block 351.

FIG. 5B shows block 364 representing an ARRAY OF FREQUENCY LOCATION ANGLE REGISTERS. Each digital frequency location angle register has a predetermined range and contains a value that corresponds to a respective frequency band location number. There is typically one FREQUENCY LOCATION ANGLE REGISTER for each element in each set. Each set of element values typically has as many elements as there are frequency band location numbers plus the number of tonal values in TONAL REGISTER ARRAY 317. The first frequency band location number in the first register within the SECOND REGISTER ARRAY 342 of FIG. 5A will typically be modified by ADDER 352 to be the value within the first register of first register array 351 in FIG. 5B and will typically correspond to the value within the first register within the array of Frequency Location Angle Registers 364.

Referring again to FIG. 5B, the blocks within phantom box 370 represent a fifth means coupled to the ARRAY OF OUTPUT ANGLE registers 364 that are responsive to the control means 334 via line 355 for sequentially adding each shifted segment frequency value on line 354 or 353 to the previous contents of a corresponding OUTPUT ANGLE REGISTER on line 365 within the ARRAY OF OUTPUT ANGLE REGISTERS 364 and storing the sum in the same OUTPUT ANGLE REGISTER within the ARRAY 364. When viewed as a function of time, the values in each register within the ARRAY OF OUTPUT ANGLE REGISTERS 364 will appear to be sawtooth in shape.

FIG. 5B also shows SINE ROM block 368 representing a SIXTH MEANS responsive to each segment angle sample value for sequentially sampling each segment angle sample value in a predetermined sequence and providing a digital value representing the sine of each respective segment angle sample value on signal line or bus 363.

THIRD ARRAY REGISTER of FIG. 5B block 253 represents a third array of addressable digital gain registers responsive to control means 334 via line 355. Each third array addressable digital gain register is initialized by the operator or other means to have a digital gain value that characterizes the gain of a respective frequency segment. Multiplier 251 multiplies the digital value representing the SINE of each respective segment angle sample value on bus 363 by the respective digital gain value to obtain the desired and predetermined amplitude gain value of a corresponding frequency segment.

Blocks 251, 263 and 264 are coupled to form a SEVENTH MEANS 259 responsive to the control means 334 for sequentially multiplying each segment angle SINE value within a set of corresponding segment sample values on line 363 by the corresponding THIRD ARRAY REGISTER 253 amplitude value on line 254 and sequentially adding via ADDER 263 each product to the OUTPUT ACCUMULATOR 264 to obtain a sample total or composite output noise signal sample value for transfer to DAC 274.

The sm of the digital values appearing in the output accumulator register 264 form a series of sequential digital values. This series of digital values are sequentially converted by the DAC into a continuous analog signal voltage. The continuous analog signal voltage is scaled and buffered by buffer amplifier 276 for use in driving a load 290.

Referring again to FIG. 5A, in another more particular embodiment of the above invention frequency synthesizer, the means for providing a clocked sequence of random values within a predetermined range, wherein each random value has an amplitude conforming to a predetermined amplitude distribution represented by phantom block 320, further comprises an eighth and ninth means such as the functions characterized by blocks 322 and 324, respectively.

Block 322 represents an EIGHTH MEANS responsive to the clock signal for generating a sequential series of random digital random numbers. Each random number has a magnitude within a predetermined range. A typical range would be scaled from zero to one. The random numbers will typically be characterized by digital numbers having 16 to 32 bits.

Block 324 is coupled to receive the series of digital random numbers from the RANDOM NUMBER GENERATOR 322. Block 324 represents a NINTH MEANS responsive to the series of digital random numbers from random number generator 322, for providing a corresponding predetermined probability density function shaped series of digital random numbers. the probability density function shape selected might typically be gaussian like or a triangular shape having an apex at the geometric center of a respective segment or frequency band and a zero value at frequency limits at the geometric centers of adjacent bands. The shape is typically selected to produce a smooth transition of noise power spectrum shape from one shifted frequency segment to the adjacent ones while confining the segment's noise power close to the center of the predetermined segment's center frequency.

In a typical embodiment, NINTH MEANS block 324 represents a ninth means for providing a probability density function shaped digital density number for each digital random number further comprises a ROM (not shown) having address input lines characterized by bus 323 coupled to receive each digital random number, and having an output bus 325.

The ROM responds to a signal from the control means 334 to provide a probability density function shaped digital density number on its output bus 325 in response to each digital random number on its input address lines 323.

The ROM is further characterized to set the value of each probability density function shaped digital density number on its output bus 325 in response to a digital random number on its input bus 323 address lines to a predetermined output magnitude to input address relationship. In this way, the sequential series of probability density function shaped digital density numbers appearing on output bus 325 shape the probability of noise frequencies deviating to values within each frequency segment. The probability density function is operated to output values at a rate that equals or exceeds the maximum sample rate. The maximum sample rate must be at least twice the frequency of the highest frequency of interest in accordance with the NYQUIST Criterion.

BAND RANGE VALUES block 328 represents a second means responsive to the CONTROL MEANS 334 for providing a clocked sequence of digital band range values. Block 328 is typically comprised of an array of addressable digital registers (not shown). Each digital band register is initialized by an operator or other means to contain a predetermined digital constant characterizing the band width of a corresponding octave segment. Each digital band register within block 328 is coupled to a control bus coupled to the CONTROL MEANS and a clock input and is responsive to the clock signal.

Block 330 titled OCTAVE WRITE CONTROL is typically a sequencer control circuit formed by coupling a set of counters to a master counter. The OCTAVE WRITE CONTROL enables the delta theta values contained within Frequency Change Registers of FIRST REGISTER ARRAY 351 to change more often at higher frequencies than at lower frequencies. Block 330 also controls the writing into 352 until a sufficient dwell time has elapsed after each update. It is understood that counters are often implemented in general and special purpose digital computers by incrementing or decrementing the value in a digital register.

It is also clear that if the control means provides a signal to the OCTAVE WRITE CONTROL block 330 to freeze or stop updating a particular Frequency Change Value Register in array 351, the output from this register will result in pure tone in the output signal, the tone having a predetermined frequency within the shifted segment's predetermined bandwidth.

Each digital register within BAND RANGE VALUES block 328 has it output coupled to a common digital band range value bus, such as 329. The third means 326 is coupled to the common digital band range bus 329 for sequentially selecting each respective digital band range value and functionally combining each respective selected digital band range value on output bus 325 representing the corresponding probability density function shaped random number to form a respective digital random frequency change value, i.e. a value defining the frequency change that a frequency band or segment oscillator output will be shifted with respect to its frequency band location number or reference frequency from a register within SECOND REGISTER ARRAY 342.

The THIRD MEANS of phantom block 340 is responsive to the control means for selecting each respective digital band range value on bus 329 and functionally combining each respective selected digital band range value with the corresponding probability density function shaped digital random number on 325 to form a digital random frequency change value is typically implemented using MULTIPLIER 326 having a first and second inputs A and B fed by signals on 325 and 329, and an output C.

The MULTIPLIER 326 first input A is typically coupled to receive the seqeunce of probability density function shaped digital random numbers on output bus 325.

The multiplier second input B is typically coupled to receive the corresponding sequence of digital range band values.

The multiplier output is typically coupled to a FIRST REGISTER ARRAY 351 via multiplier bus 327. A FOURTH MEANS, such as ADDER 352, sequentially combines the digital value of each frequency band location number with a corresponding digital random segment frequency shift value from each of the frequency change value registers in 351 to form a digital shifted segment frequency value.

The fourth means, represented in FIG. 5A by phantom block 350, is responsive to the control means 334 for combining the value of each frequency band location number stored in SECOND REGISTER ARRAY 342 with a corresponding random frequency shift value stored in FIRST REGISTER ARRAY 351 to form a shifted segment frequency value on line 354. Each shifted segment frequency value represents a frequency corresponding to a frequency band location number or segment reference frequency shifted by the random segment frequency shift value on line 343.

Referring to FIG. 5A, the fourth means ADDER 352 has a first input A coupled to sequentially receive each frequency band location number from SECOND REGISTER ARRAY 342 on line 344 and a second input B coupled to sequentially receive each corresponding digital random segment frequency shift value from the FIRST REGISTER ARRAY 351 on line 343. ADDER 352 provides a sequence of sums at output C to line 354. The sum of each the frequency band location numbers and each corresponding digital random segment frequency shift value form a repeating series of sequential corresponding shifted segment frequency sample values at the adder output C.

The fifth means 370 has a first input coupled to the fourth means ADDER 352 output C to receive the sequence of corresponding shifted segment frequency sample values on line 354.

Elements within phantom block 360 include FIFTH MEANS 370 and represent a typical means responsive to the control means 334 for sequentially adding each shifted segment frequency value on line 354 to the previous contents of a corresponding segment angle accumulator, such as those characterized within block 364. The elements within block 360 therefore form an array of digital oscillators, the outputs of which are represented by the values appearing in the ARRAY OF OUTPUT ANGLE REGISTERS 364. The outputs of the oscillators thus formed have noise like fluctuations in their respective frequencies. The random numbers from block 322 are characterized to have a very long ergotic period. The contents of each accmulator of those within array 364 form corresponding segment angle sample values.

Phantom block 370 represents a fifth means that typically has a SELECTOR SWITCH 362, that is responsive to a control input from control means 334 on control line 355. The selector switch 362 has an input A coupled to sequentially receive each respective shifted segment frequency value of each set of shifted segment frequency values occurring on line 354.

Selector switch 362 has a second input B coupled to line 353 to permit the selection of constant frequency tonal values from TONAL REGISTER ARRAY 317 on FIG. 5A. The SELECTOR SWITCH 362 is typically an electronic selector such as a multiplexer. Control for the SELECTOR SWITCH 362 is provided via control signals on control bus 355 from control means 334. The SELECTOR SWITCH 362 has an output C coupled to the first input A of ADDER 366. ADDER 366 has a first and second input A and B, respectively. ADDER 366 output C is coupled to the array of output angle registers 364 and is directed to the proper register by clock signals on line 333 and by control signals on 355.

The ADDER 366 second input is coupled to receive the last or most recent output of each frequency location angle register within ARRAY OF OUTPUT ANGLE REGISTERS 364, in sequence with a corresponding shifted segment frequency value.

Blocks 251 and 263 represent a MULTIPLIER and ADDER respectively, and together form a means responsive to the control means for sequentially multiplying each segment's SINE sample value from the value of the contents of a corresponding THIRD ARRAY REGISTER and adding each product to the OUTPUT ACCUMULATOR REGISTER 264. The OUTPUT ACCUMMULATOR REGISTER 264 accumulates a partial sum to which multiplied segment angle sample values are algebraically added. These values can be positive or negative values. Each segment has a respective multiplied segment angle sample value. All sample values within a set of sample values are summed in OUTPUT ACCUMULATOR REGISTER 264. The sum of each set forms a composite sampled signal which is the output to DAC 274 under clock control from 332.

In another alternative embodiment of the invention frequency synthesizer for continuously generating a continuous output noise signal, the output noise signal to load 272 is formed by a series of sequential digital values appearing in an output accumulator, such as OUTPUT ACCUMULATOR REGISTER 264. The output noise signal has an operator controlled predetermined noise amplitude distribution within at least one predetermined frequency band. This embodiment also has a first array of frequency band location digital registers, such as SECOND REGISTER ARRAY 342. Each frequency band location array register 342 is initialized to contain a respective frequency band location number.

A digital means is included, such as that characterized by ADDER 352 and phantom blocks 320 and 340 for applying a random frequency shift value to each respective frequency band location number to obtain a shifted segment frequency value. Phantom block 370 and ARRAY OF OUTPUT ANGLE REGISTERS 364 are included for combining and storing each respective shifted segment frequency value in a respective or corresponding shifted frequency angle register. This alternative embodiment also requires an array of gain control registers. Each gain array register, such as those within THIRD ARRAY REGISTERS block 253, has an operator or other means, such as by a preprogrammed computer, initialized amplitude gain value.

SINE ROM 368 represents a means for obtaining the SINE of each respective shifted freqency location angle register angle value. MULTIPLIER block 251 multiplies each respecive shifted frequency location angle SINE value on line or bus 363 by a respective third array register gain value from THIRD REGISTER ARRAY 253 to obtain a respective gain corrected shifted frequency angle SINE value at MULTIPLIER 251 output (C).

Phantom block 260 represents a means for adding each respective gain corrected shifted frequency SINE sample value for each respective shifted frequency segment to obtain a composite output noise signal sample value. It should be understood that the gain corrected shifted frequency angle SINE values for each segment that are added to make a single output noise signal sample value are both positive and negative values since the lower frequency signals will appear to be relatively unchanging while the higher frequency segments are experiencing several alternating polarities.

Accordingly, there has been described a frequency synthesizer for directly and continuously generating an output noise signal having a controlled spectral shape, the output being directly synthesized by an array or set of digital oscillators. The output noise signal is synthesized by sequentially sampling the output amplitude of each oscillator in the array in sequence and summing the values of the samples to form a composite output sample signal. Although the invention has been disclosed and illustrated in detail, it is to be clearly understood that the same is by way of illustration and example only and is not to be taken by way of limitation. The spirit and scope of this invention is limited only by the terms of the appended claims.

I claim:

1. A frequency synthesizer for continuously generating an output noise signal, said frequency synthesizer comprising:
   digital means for directly synthesizing random noise having a controlled spectral shape, said digital means having;
   a means for providing and for periodically changing a series of sets shifted segment frequency values, each set having an ordered number of element values, each element value being a random digital number selected to be within a range corresponding to a segment frequency band and characterizing a shifted segment frequency value;
   a plurality of digital oscillators, each oscillator having a corresponding segment frequency band, each oscillator output being a series of digital values that sequentially characterize a sinusoid having a frequency characterized by the corresponding shifted segment frequency of the respective frequency band;
   means for sampling each digital oscillator output to form said output noise signal characterized by a continuous series of digital composite output noise signal sample values.

2. The frequency synthesizer of claim 1 wherein said digital means for sampling each digital oscillator output to form said output noise signal characterized by a continuous series of digital composite output noise signal sample values further comprises:
   means for sequentially sampling the output amplitude of each oscillator and for combining each sampled oscillator output value with a corresponding predetermined frequency segment gain value to obtain a corresponding set of segment gain scaled sampled values,
   means for summing each segment gain scaled sample value within the set to obtain a composite frequency synthesizer output noise signal sample value,
   means for forming a continuous output signal from a series of said composite frequency synthesizer output noise signal sample values.

3. A frequency synthesizer for continuously generating an output noise signal, said frequency synthesizer comprising:
   a means for characterizing a predetermined array of frequency band ranges, each frequency band range being located on the frequency spectrum by a corresponding array of frequency band location numbers;
   means for generating sets of random numbers, each random number in each set corresponding to a frequency band location number and being scaled to have a value within a range corresponding to the frequency band range of its related frequency band location number;
   means for functionally combining each respective random number with its corresponding frequency band location number to obtain a corresponding set of shifted segment frequency values;
   an array of digital oscillators, each digital oscillator corresponding to a frequency band range and having a sinusoidal output and a frequency characterized by a respective shifted segment frequency value;
   means for sampling the amplitude of the output of each oscillator in the array to obtain a corresponding set of sampled oscillator output values;
   means for functionally combining each sampled oscillator output value with a corresponding predetermined segment gain value to obtain a corresponding set of segment gain scaled sampled values;
   means for summing each segment gain scaled sample value within the set to obtain a composite frequency synthesizer output noise signal sample value;
   means for forming a continuous output signal from a series of said composite frequency synthesizer output noise signal sample values.

4. The frequency synthesizer of claim 3 wherein each digital oscillator further comprises:

an array of output angle registers, each output angle register corresponding to a frequency band location number and a shifted segment frequency value;

means for replacing the contents of each respective output angle register with the sum of its respective digital random frequency change value, and its respective last output angle register value;

whereby the contents of each of said output angle register is sequentially updated to hold an output angle value.

5. A frequency synthesizer for continuously generating a continuous output noise signal, the output noise signal being formed by a series of sequential digital values appearing in an output accumulator, the series of digital values each being sequentially coupled to a digital to analog converter (DAC) and converted to a continuous analog signal voltage, the continuous analog voltage values then being coupled to the input of a buffer amplifier, the buffer amplifier conditioning of the signal for application to a load, the output noise signal having an operator controlled predetermined noise amplitude distribution within at least one predetermined frequency band, the frequency synthesizer comprising:

a clock signal source providing at least one source of clock signals;

a control means responsive to said clock signals;

a first means for sequentially providing a clocked sequence of probability density function shaped digital random numbers within a predetermined range of values;

second means responsive to said control means for sequentially providing a clocked sequence of digital band range values, each digital band range value characterizing the frequency band width of a predetermined frequency segment;

third means having a first array of addressable digital registers, said third means being responsive to said control means for sequentially selecting each respective digital band range value and functionally combining each respective selected digital band range value with said corresponding probability density function shaped digital random number to form a digital random frequency change value and to store each successive digital random frequency change value in a respective first array digital register;

a second array of addressable digital registers, each second array digital register being initialized by said operator to contain a respective frequency band location number;

fourth means responsive to said control means for sequentially combining the value of each respective frequency band location number with a corresponding digital random frequency change value to form repeating sets of shifted segment frequency values, each shifted segment frequency value characterizing a frequency corresponding to a respective frequency band location frequency shifted by said digital random frequency change value;

an array of output angle registers, each said output angle register having a predetermined range, each said register being characterized to reset as the contents of said register exceeds said predetermined range, and each said register corresponds to a respective frequency band location number;

a fifth means having an output coupled to said array of output angle registers, and responsive to said control means for sequentially adding each shifted segment's frequency value in each set of shifted segment frequency values to the previous contents of a corresponding output angle register and storing the sum in the corresponding unit angle register, the contents of each output angle register forming a corresponding segment angle sample value;

sixth means responsive to each segment angle sample value in the array of output angle registers for sequentially sampling each segment angle sample value and providing a segment angle SINE value representing the SINE of each respective segment angle sample value;

a third array of addressable digital registers, each third array addressable digital register being initialized to have a value characterizing the amplitude value of a corresponding frequency segment;

seventh means responsive to said control means for sequentially multiplying each segment angle SINE value in each set by the corresponding third array accumulator amplitude value in the set and sequentially adding each product to said output accumulator to obtain a sum for each set, the output of the accumulator being a continuous series of sums, each sum being a digital value;

whereby, said digital values appearing in said output accumulator register form of series of sequential digital values, this series of values being sequentially converted by said DAC into said continuous analog signal voltage, said continuous analog voltage being scaled and buffered for use in driving a load.

6. The frequency synthesizer of claim 5 wherein said means for providing a clocked sequence of random values within a predetermined range, each random value having an amplitude conforming to a predetermined amplitude distribution further comprises:

an eighth means responsive to said clock signal for generating a sequential series of digital random numbers, each digital random number having a magnitude within a predetermined range, and a ninth means responsive to said series of digital random numbers for providing a corresponding probability density function shaped digital random numbers.

7. The frequency synthesizer of claim 6 wherein said ninth means for providing a probability density function shaped digital density number of each digital random number further comprises:

a ROM having address input lines coupled to receive each digital random number, and having an output bus, the ROM being characterized to provide a probability of density function shaped digital density number on its output bus in response to each digital random number on its input address lines, said ROM being further characterized to conform the magnitude of each probability density function shaped digital density number on its output bus in response to a digital random number on its input bus address lines to a predetermined output magnitude to input address relationship;

whereby, said sequential series of probability density function shaped digital density numbers shape the probability of noise frequencies deviating to values within frequency segments.

8. The frequency synthesizer of claim 5 wherein said second means responsive to said control means for providing a clocked sequence of digital band range values further comprises:

an array of addressable digital registers, each digital band register being initialized to contain a predetermined digital constant characterizing the band width of a corresponding octave segment, and having a control bus coupled to said control means and a clock input responsive to said clock signal, each register having its output coupled to a common digital band range value bus, said third means being coupled to said digital and range bus for sequentially selecting each respective digital band range value and functionally combining each respective selected digital band range value with said corresponding probability density function shaped digital random number to form a respective digital random frequency change value.

9. The frequency synthesizer of claim 5 wherein said third means responsive to said control means for selecting each respective digital band range value and functionally combining each respective selected digital band range value with said corresponding probability density function shaped digital random number to form a digital random frequency change value further comprises:

a multiplier having a first and second input and an output;
said multiplier first input being coupled to receive said sequence of probability density function shaped digital random numbers;
said second multiplier input being coupled to receive said corresponding sequence of digital range band values;
said multiplier output being coupled to said fourth means responsive to said control means for sequentially combining the digital value of each frequency band location number with a corresponding digital random segment frequency shift value to form a digital shifted segment frequency value.

10. The frequency synthesizer of claim 5 wherein said fourth means responsive to said control means for combining the value of each frequency band location number with a corresponding random frequency shift value to form a shifted segment frequency value, each shifted segment frequency value characterizing a frequency corresponding to a segment reference frequency shifted by said random segment frequency shift value further comprises:

an adder having a first input coupled to sequentially receive each frequency band location number and a second input coupled to sequentially receive each corresponding digital random segment frequency shift value, and an output, said adder providing a sequence of sums,
the sum of each said frequency band location number and each said corresponding digital random segment frequency shift value forming a series of sequential corresponding segment angle sample values at said adder output,
said fifth means having a first input coupled to said adder output to receive said sequence of corresponding segment angle sample values.

11. The frequency synthesizer of claim 5 wherein said fifth means of sequentially adding each shifted segment frequency value in each set of shifted segment frequency values to the previous contents of a corresponding output angle register, and storing the sum in the corresponding output angle register, the contents of each output angle register forming a corresponding segment angle sample value; said fifth means further comprising:

a selector switch having a first input coupled to sequentially receive each respective shifted segment frequency value and a second input to sequentially receive constant tonal frequency values from said tonal register array,
said selector switch being responsive to said control means to repetitively couple a controlled sequence of shifted segment frequency values and tonal frequency values to its output; and
an adder having a first and second input, said first input being coupled to said selector switch output, and said adder output being coupled to said array of output angle registers,
said adder second input being coupled to receive the output of each output angle register in sequence with a corresponding shifted segment frequency value,
said fifth means being responsive to tonal signals from a tonal register array, each tonal register being initialized to contain a predetermined tonal frequency.

12. A frequency synthesizer for continuously generating a continuous output noise signal, the output noise signal being formed by a series of sequential digital values appearing in an output accumulator, the output noise signal having a controlled amplitude distribution within at least one predetermined frequency band, the frequency synthesizer comprising:

a first array of digital registers, each first array register being initialized to contain a respective frequency band location number;
digital means for applying a random frequency shift value to each respective frequency band location number to obtain a shifted segment frequency value and for storing each respective shifted segment frequency value in a respective output angle register;
a third array of registers, each third array register having an operator set amplitude gain value;
means for obtaining the SINE of each respective output location angle register angle value and for multiplying each respective output location angle SINE value by a respective third array register gain value to obtain a respective gain scaled shifted frequency angle SINE value;
means for adding each respective gain scaled shifted frequency angle SINE value for each respective shifted frequency segment to obtain an output noise signal sample value.

* * * * *